(12) United States Patent
Kamma

(10) Patent No.: US 8,934,150 B2
(45) Date of Patent: Jan. 13, 2015

(54) IMAGE PROCESSING SYSTEM, IMAGE PROCESSING METHOD, IMAGE PROCESSING APPARATUS, AND NON-TRANSITORY COMPUTER READABLE MEDIUM STORING IMAGE PROCESSING PROGRAM

(71) Applicant: Brother Kogyo Kabushiki Kaisha, Nagoya (JP)

(72) Inventor: Yui Kamma, Kasugai (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/975,188

(22) Filed: Aug. 23, 2013

(65) Prior Publication Data
US 2014/0055828 A1    Feb. 27, 2014

(30) Foreign Application Priority Data
Aug. 24, 2012    (JP) .................................. 2012-185887

(51) Int. Cl.
*H04N 1/04* (2006.01)
*H04N 1/64* (2006.01)
*G06F 17/30* (2006.01)

(52) U.S. Cl.
CPC ............ *H04N 1/64* (2013.01); *G06F 17/30253* (2013.01)
USPC ........................... 358/474; 358/1.15; 382/167

(58) Field of Classification Search
CPC ......... H04N 1/417; H04N 11/02; H04N 7/01; H04N 11/04; H04N 13/02; H04N 17/00; H04N 17/02; H04N 3/22; H04N 3/223; H04N 3/27; H04N 5/44; H04N 5/45; H04N 5/91; H04N 5/95; H04N 7/00
USPC ........ 358/1.15, 442, 403, 474, 486, 498, 488, 358/448; 382/245, 144, 176
See application file for complete search history.

(56) References Cited

U.S. PATENT DOCUMENTS

| 4,873,630 | A | * | 10/1989 | Rusterholz et al. ................ 712/3 |
| 4,875,206 | A | * | 10/1989 | Nichols et al. ................ 370/427 |
| 5,323,175 | A | * | 6/1994 | Doi et al. ........................ 345/467 |
| 6,177,934 | B1 | * | 1/2001 | Sugiura et al. ................ 715/748 |
| 6,483,609 | B1 | * | 11/2002 | Ueno et al. ..................... 358/434 |

(Continued)

FOREIGN PATENT DOCUMENTS

| JP | 2001-291085 A | 10/2001 |
| JP | 2004-258724 A | 9/2004 |

(Continued)

*Primary Examiner* — Negussie Worku
(74) *Attorney, Agent, or Firm* — Merchant & Gould PC

(57) ABSTRACT

There is provided an image processing system including an image acquisition mechanism configured to acquire an image data; a first generator configured to generate, according to one image based on the image data acquired by the image acquisition mechanism, a first data in a first format in which there are arranged a plurality of elements generated based on the image data and which is different from the image data; a second generator configured to generate a second data in a second format in which there is arranged the one image based on the image data as one element and which is different from the image data; and a storage control section configured to associate the first data generated by the first generator with the second data generated by the second generator, and to store the associated first data and second data into a storage section.

17 Claims, 7 Drawing Sheets

(56) References Cited

U.S. PATENT DOCUMENTS

| | | | |
|---|---|---|---|
| 6,718,122 B1 * | 4/2004 | Ishii et al. | 386/328 |
| 7,006,263 B2 * | 2/2006 | Takahashi | 358/474 |
| 7,428,534 B2 * | 9/2008 | Ito et al. | 1/1 |
| 7,474,434 B2 * | 1/2009 | Lech et al. | 358/1.15 |
| 7,570,383 B2 * | 8/2009 | Lech et al. | 358/1.15 |
| 7,724,353 B2 * | 5/2010 | Iizuka | 356/4.03 |
| 8,711,439 B2 * | 4/2014 | Nacman et al. | 358/444 |
| 2011/0134489 A1 * | 6/2011 | Suzuki | 358/448 |

FOREIGN PATENT DOCUMENTS

| | | |
|---|---|---|
| JP | 2006-135903 A | 5/2006 |
| JP | 2006-287588 A | 10/2006 |

* cited by examiner

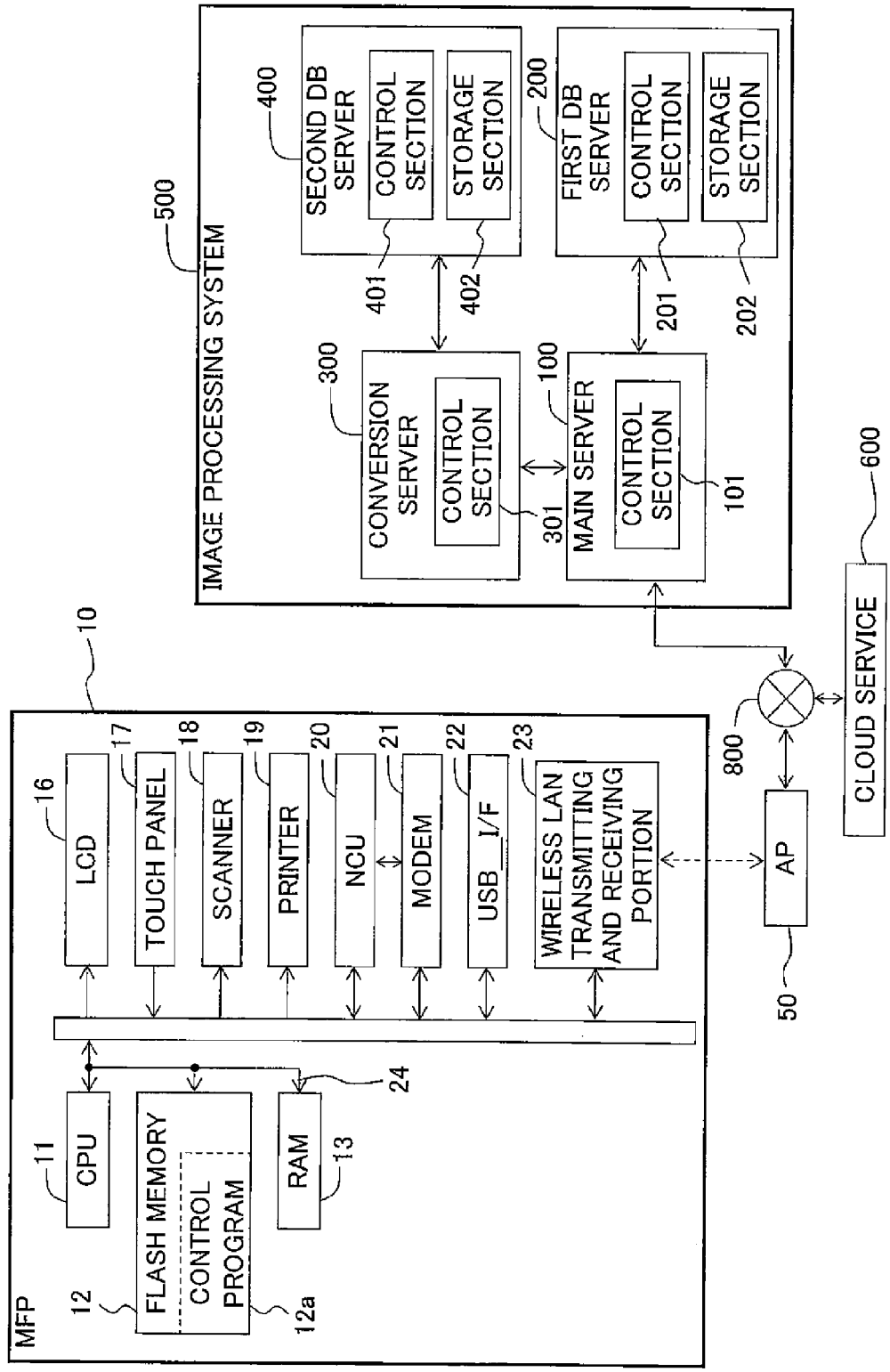

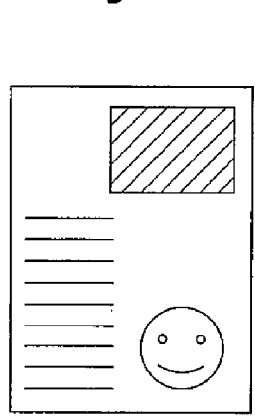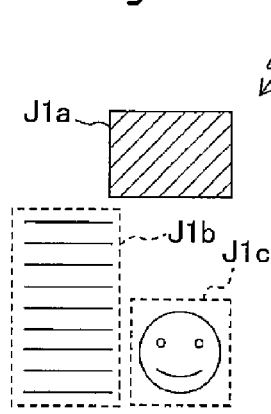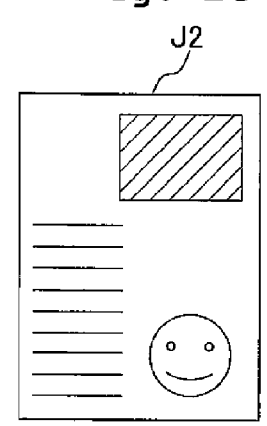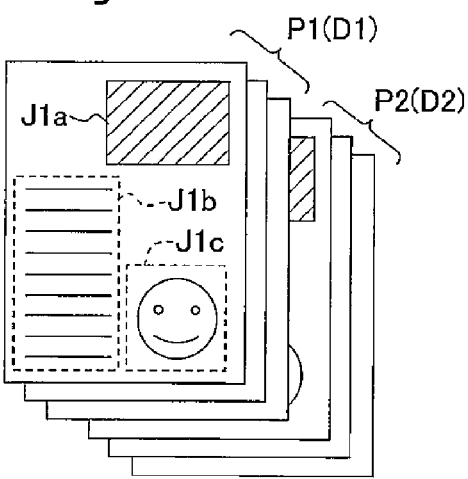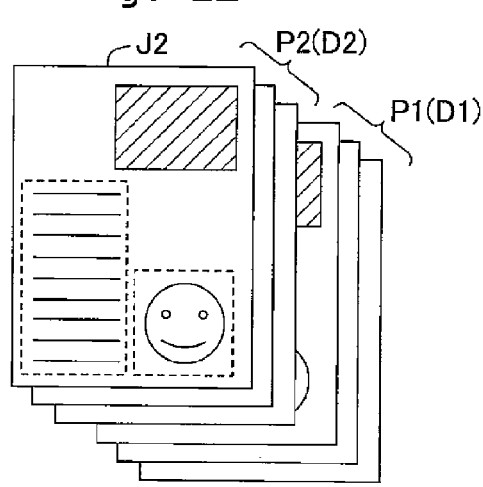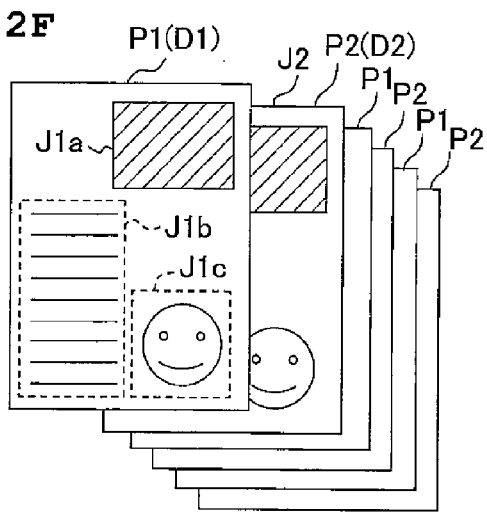

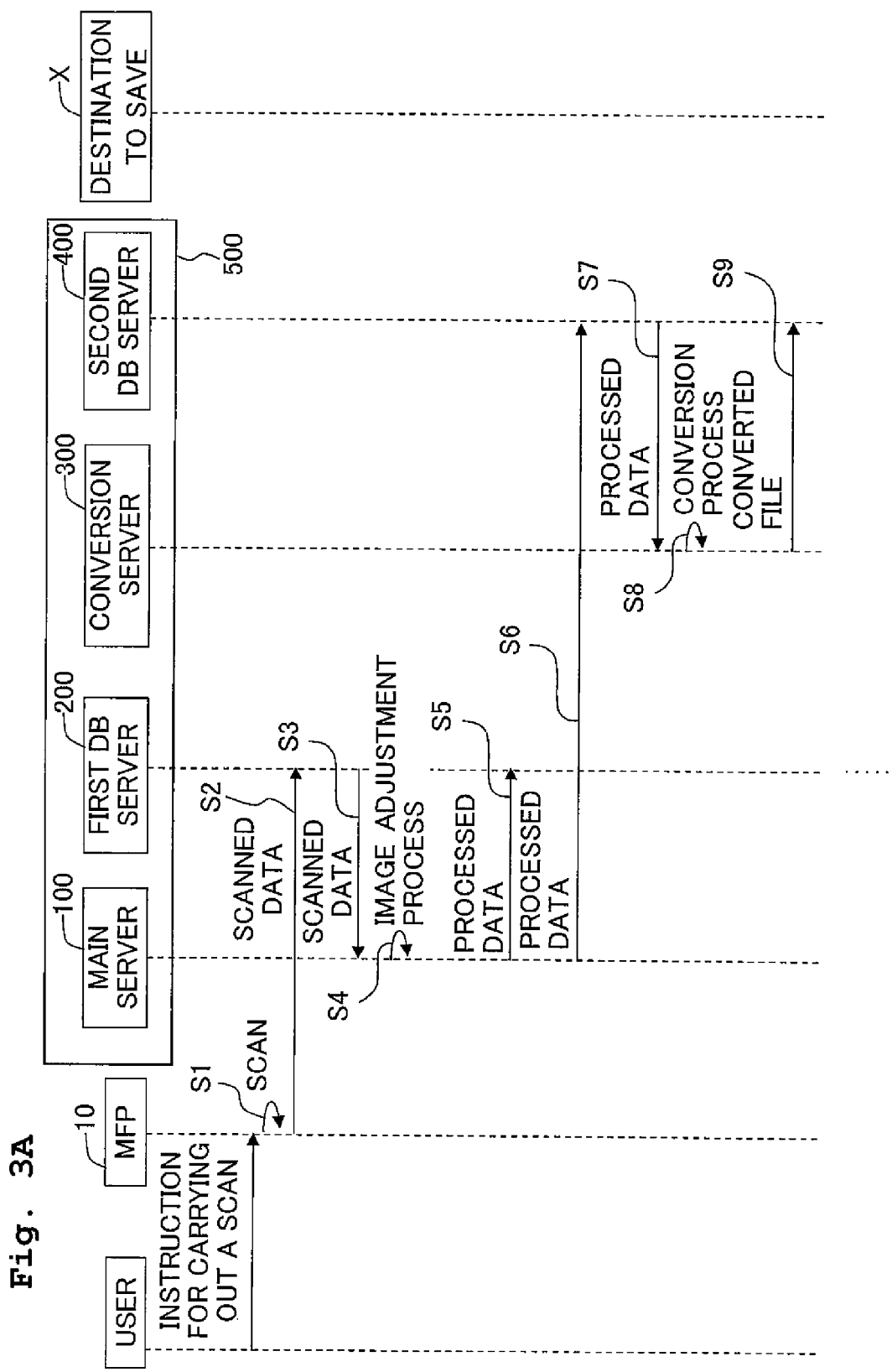

(PROCESS AT MAIN SERVER)

IMAGE PROCESSING SYSTEM, IMAGE PROCESSING METHOD, IMAGE PROCESSING APPARATUS, AND NON-TRANSITORY COMPUTER READABLE MEDIUM STORING IMAGE PROCESSING PROGRAM

CROSS REFERENCE TO RELATED APPLICATION

The present invention claims priority from Japanese Patent Application No. 2012-185887, filed on Aug. 24, 2012, the disclosure of which is incorporated herein by reference in its entirety.

BACKGROUND OF THE INVENTION

1. Field of the Invention

The present invention relates to an image processing system, an image processing method, an image processing apparatus, and a non-transitory computer readable medium storing an image processing program.

2. Description of the Related Art

There is known an electronic file registration method for analyzing an image data scanned or read by a scanner, converting the image data into a predetermined format usable by applications such as WORD (registered trademark), browsers and the like, and registering the obtained file into a database.

SUMMARY OF THE INVENTION

In the above described electronic file registration method, when converting an image data read by a scanner into a predetermined-format file which can be referenced and edited by the abovementioned applications, it is possible for that image data to be incorrectly analyzed. When the image data is incorrectly analyzed, then the generated file in the predetermined format is subjected to having a different content from the original image data such as the text, layout and the like. Incorrect analysis of image data is likely to occur in, for example, recognition of the type of character font. Further, it is also likely to occur in such cases as with small characters, design effect added to character strings, image overlapped with text, etc.

Here, referring to FIGS. 6A and 6B, an example is shown that problems occur in the content of a predetermined-format file generated by conversion due to incorrect analysis of an image data. In FIGS. 6A and 6B, for example, a text A1 described as "Give and take:" in the original image data is incorrectly converted into a text B1 described as "aive and take:" in the predetermined-format file generated by the conversion. Further, in the original image data, a text A2 to which a design effect is added is converted into a text B2 completely different from the text A2.

In this case, it is assumable that a user desires to compare the original image data with the predetermined-format file generated by the conversion, and to confirm the different parts in this file in the predetermined format from the original image data. Further, for example, it is assumable that in order to determine whether to let the original image data or to let the converted file be an output object, the user desires to compare the both. However, in the above described method, because only the predetermined-format file generated by the conversion is registered into the database, management of the original image data as an object for comparison is consigned to the user. Hence, for example, if by any chance the user has mistakenly disposed of the original image data, the manuscript of the image data or the like, then the object for comparison is lost. Thus, it becomes difficult to compare the generated predetermined-format file with the original image data.

The present invention is made for solving the above problem, and an object thereof is to provide an image processing system, an image processing method, an image processing apparatus, and a computer readable medium storing an image processing program which have improved the convenience in converting the image data into a file in a format displayable or editable by a predetermined application.

According to a first aspect of the present teaching, there is provided an image processing system including: an image acquisition mechanism configured to acquire an image data; a first generator configured to cause a conversion section to generate, according to one image based on the image data acquired by the image acquisition mechanism, a first data in a first format in which there are arranged a plurality of elements generated based on the image data and which is different from the image data; a second generator configured to generate a second data in a second format in which there is arranged the one image based on the image data as one element and which is different from the image data; and a storage control section configured to associate the first data generated by the first generator with the second data generated by the second generator, and to store the associated first data and second data into a storage section.

Further, it is possible to configure the present teaching in various aspects such as an image processing apparatus, a control apparatus controlling an image processing apparatus, an image processing method, an image processing program, a recording medium recording an image processing program, etc.

By the image processing system according to the first aspect of the present invention, according to one image based on an image data acquired by an image acquisition mechanism, there is generated a first data in a first format in which there are arranged a plurality of elements generated based on the image data and which is different from the image data. On the other hand, there is generated a second data in a second format in which there is arranged the one image based on the acquired image data as one element and which is different from the image data. Because the first data and second data generated in this manner are associated and stored into a storage section, a user is able to easily carry out a comparison between the first data and the second data. Hence, even though the image data is converted into a file in a format displayable or editable by a predetermined application, it is still easy to compare the content of the original image data with the content of the file generated by conversion, thereby providing an outstanding convenience. Further, in the appended claims, the terms "first format" and "second format" are used for the intention that the two formats may be either the same or different from each other.

Further, in the present teaching, the term "the second data corresponding to the first data" means that the image data corresponding to the first data is the same as the image data corresponding to the second data.

In the present teaching, the term "the first data corresponding to the second data" means that the image data corresponding to the second data is the same as the image data corresponding to the first data.

Further, in the present teaching, the term "the image data being the source to generate the second data" is used not for the intention to limit itself to the image data acquired from the image processing apparatus, but for the intention to also include any image data obtained from the former image data through a predetermined process.

By the image processing method according to a second aspect of the present teaching, it is possible to achieve a similar effect to that of the image processing system according to the first aspect of the present teaching. By the image processing program according to a third aspect of the present teaching, it is also possible to achieve a similar effect to that of the image processing system according to the first aspect of the present teaching.

BRIEF DESCRIPTION OF THE DRAWINGS

FIG. 1 is a block diagram showing a configuration of a multifunction peripheral and an image processing system;

FIGS. 2A to 2F are diagrams for schematically explaining an outline of the present teaching;

FIGS. 3A and 3B are sequence diagrams showing an image processing sequence;

DESCRIPTION OF THE PREFERRED EMBODIMENT

Figure 3B:
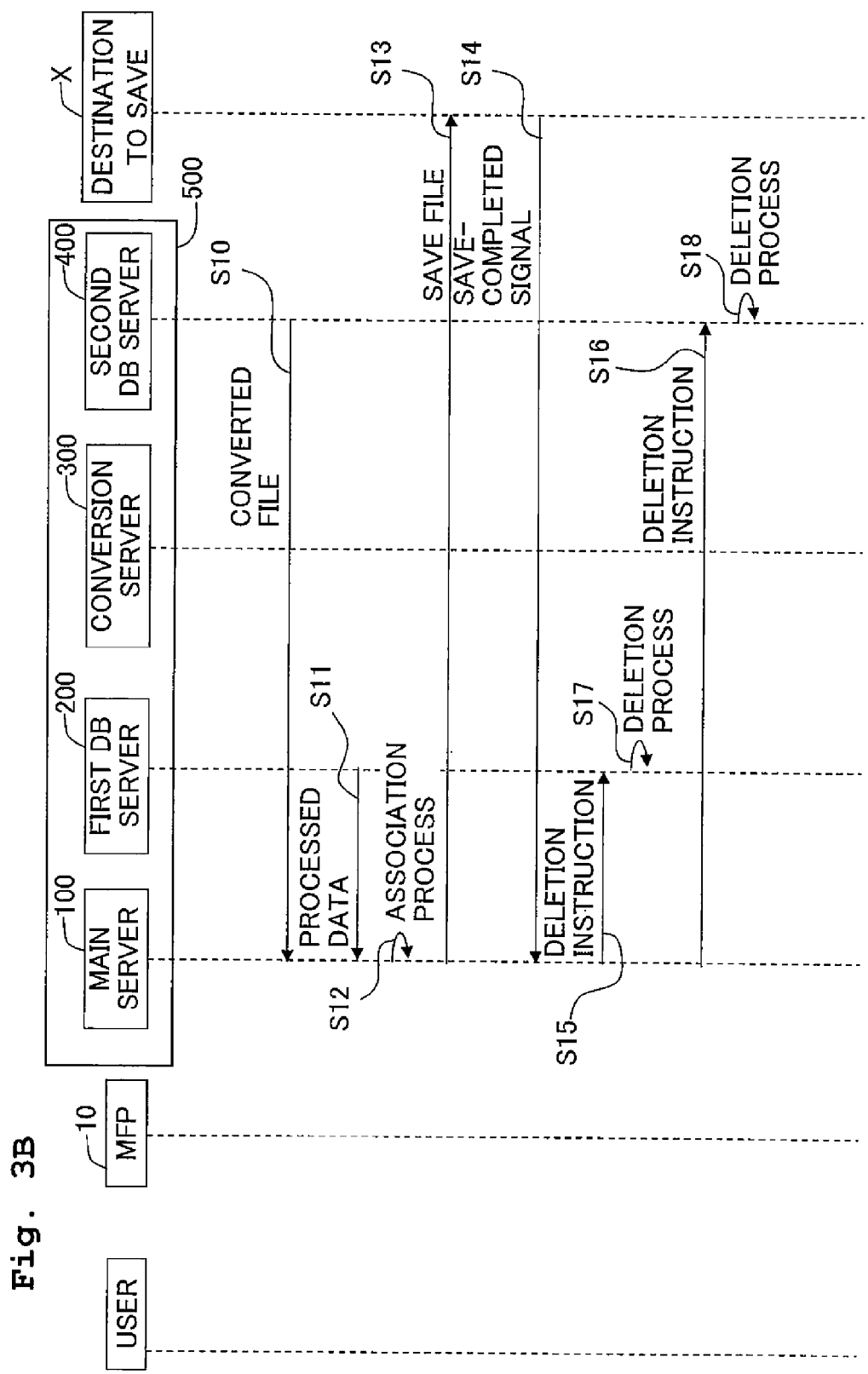

Referring to the accompanying drawings, a preferred embodiment of the present invention will be explained below. Further, there is an image processing system 500 which is an embodiment of the image processing system of the present invention.

With the details left to later description, the image processing system 500 is configured to acquire, from a multifunction peripheral 10 (hereinafter referred to as MFP 10), a scanned data or an image data of a manuscript scanned or read by a scanner 18, to convert this scanned data into a file in a predetermined format which can be referenced and edited by a predetermined application such as WORD (registered trademark), EXCEL (registered trademark), etc., and to store this file generated by the conversion into a predetermined save destination X such as the MFP 10 which has sent the scanned data, a cloud service 600, or the like. Hereinafter, the file generated by the conversion is referred to as "converted file". Especially, the image processing system 500 of this embodiment is configured to associate the converted file with the scanned data which is the source of the converted file, and to store the associated data and file into the save destination X. Therefore, the image processing system 500 is configured to be capable of easily carrying out a comparison between the content of the converted file and the content of the scanned data, that is, the image based on the scanned data.

The MFP 10 includes a CPU 11, a flash memory 12, a RAM 13, an LCD 16, a touch panel 17, the scanner 18, a printer 19, an NCU 20, a modem 21, a USB interface (referred to as a USB_I/F) 22, and a wireless LAN transmitting and receiving portion 23. The CPU 11, the flash memory 12, and the RAM 13 are connected to one another via a bus line 24. Further, the bus line 24, which connects the CPU 11, flash memory 12 and RAM 13, is connected with each of the portions 16 to 23 via an input/output port 25.

The CPU 11 controls each function of the MFP 10, and controls each portion connected with the input/output port 25, according to some fixed values and/or programs stored in the flash memory 12, some data stored in the RAM 13, or various signals sent and received via the NCU 20. The flash memory 12 is a nonvolatile memory. The flash memory 12 has stored a control program 12a configured to control the operation of the MFP 10. For example, when the user has inputted an instruction for carrying out a scan, then according to the control program 12a, the CPU 11 carries out a process of causing the scanner 18 to read a manuscript, and a process of sending the scanned data obtained by reading the manuscript to the image processing system 500. The RAM 13 is a rewritable volatile memory having a temporary area for temporarily storing various data for the CPU 11 to execute the control program 12a.

The LCD 16 is a liquid crystal display device. The touch panel 17 is provided on the screen of the LCD 16 to superimpose the LCD 16. When an indicator such as a finger, stick or the like contacts with or approaches the screen of the LCD 16, then the touch panel 17 detects the touched position or the approached position, and inputs the detected position to the MFP 10. The scanner 18 reads and converts a manuscript into a scanned data. The printer 19 prints an image based on an image data on a sheet of recording paper. The modem 21 modulates an image data to be sent in a FAX transmission into a signal transmittable to an unshown telephone network and sends the signal via the NCU 20, or demodulates a signal inputted from the telephone network via the NCU 20 into an image data. The NCU 20 connects the unshown telephone network and the MFP 10, and controls the connectional state with the telephone network by connecting or disconnecting the telephone lines according to the instruction from the modem 21. The USB_I/F 22 is configured by a publicly known device for communicably connecting, for example, another device such as a personal computer, hard disk drive or the like, and a storage medium such as a USB memory or the like, via a USB cable. The wireless LAN transmitting and receiving portion 23 communicably connects the MFP 10 and the image processing system 500 on the Internet 800 via an access point 50 (referred to as AP 50) which is a relaying device, on a wireless LAN complying with the standard of IEEE802.11b/g.

The image processing system 500 is configured to include a main server 100, a first database server 200 (referred to as a first DB server 200), a conversion server 300, and a second database server 400 (referred to as a second DB server 400).

The main server 100 functions as a window or portal of the image processing system 500. The main server 100 has a control section 101 composed of a CPU, ROM, RAM and the like which are all not shown, and an unshown Internet communication portion. By the Internet communication portion, the main server 100 is connected communicably with each of the MFP 10 and the cloud service 600 via the Internet 800. Further, by the Internet communication portion, the main server 100 is connected communicably with each of the first DB server 200 and the conversion server 300.

Figure 4:
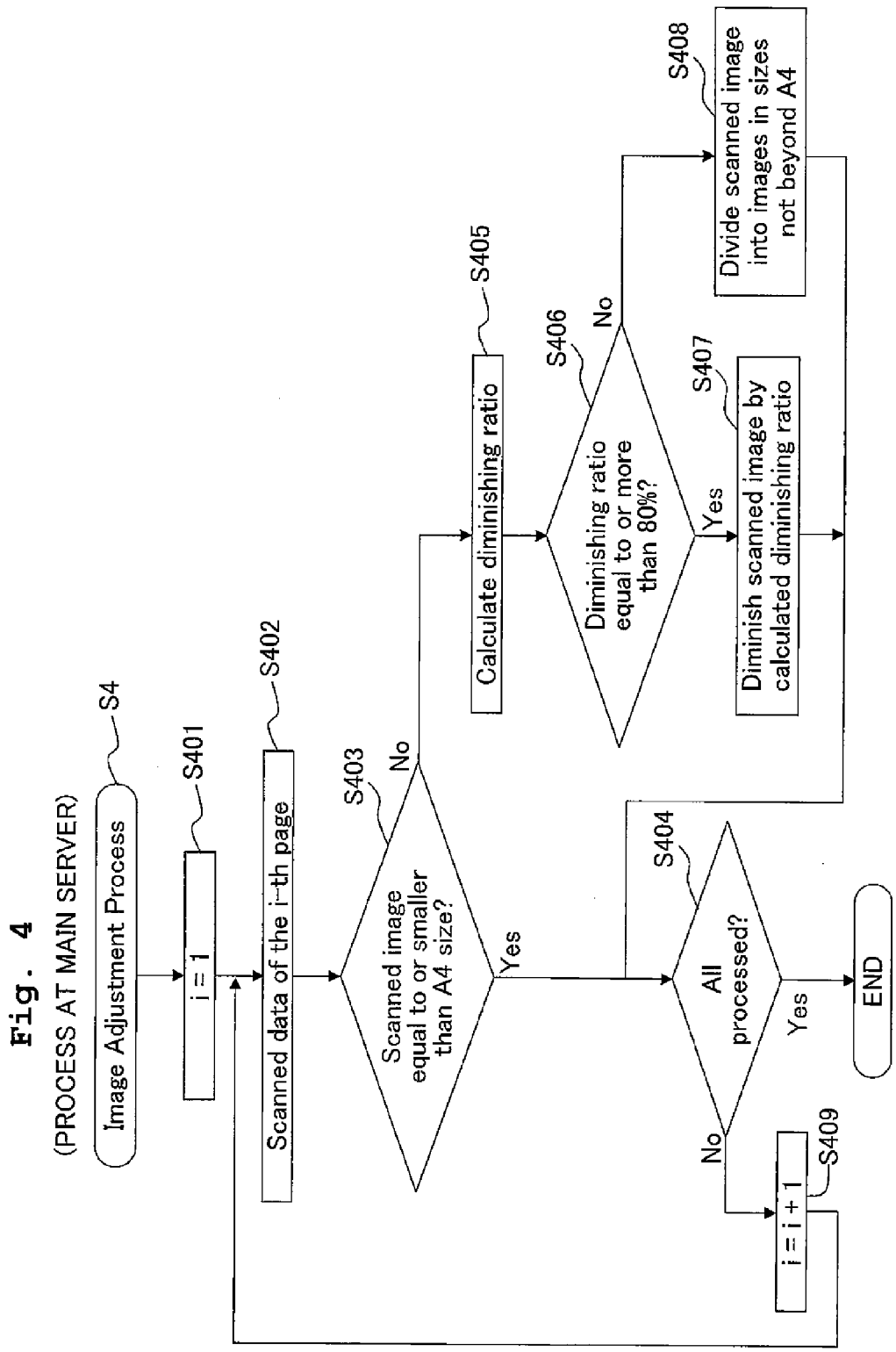
FIG. 4 is a flowchart showing an image adjustment process.

The control section 101 carries out an aftermentioned image adjustment process (see FIG. 4) on the scanned data sent from the MFP 10, and sends the obtained data to the second DB server 400 to save or store the same. Further, the control section 101 carries out an association process of associating the converted file generated by the conversion server 300 with the scanned data through the image adjustment process, and sends the file obtained by the association process to the predetermined save destination X to save the same. Hereinbelow the scanned data through the image adjustment process will be referred to as "processed data". Further, when having received a save-completed signal from the save destination X to indicate that saving of the file obtained by the association process is completed, the control section 101 sends a deletion instruction to delete the temporarily saved data and file, to each of the first DB server 200 and the second DB server 400.

The first DB server 200 functions as a database accessible from the main server 100 for the use of the main server. The first DB server 200 has a control section 201 including a CPU, ROM, RAM and the like which are all not shown, a storage section 202 including a rewritable nonvolatile memory such as hard disk drive or the like, and an unshown Internet communication section. By the Internet communication section, the first DB server 200 is connected communicably with the main server 100. The control section 201 causes the storage section 202 to save each of the scanned data received and acquired from the MFP 10 via the main server 100, and the processed data received from the main server 100. Further, when having received the deletion instruction from the main server 100, the control section 201 carries out a deletion process to delete the processed data and the like saved in the storage section 202.

The conversion server 300 serves to convert the processed data into a file in a predetermined format. For example, conversion server 300 converts the processed data into a file format which can be read in by versatile word-processing software, spreadsheet software, etc. The conversion server 300 has a control section 301 including a CPU, ROM, RAM and the like which are all not shown, and an Internet communication portion (not shown). By the Internet communication portion, the conversion server 300 is connected communicably with each of the main server 100 and the second DB server 400. The control section 301 converts the processed data, and sends the obtained converted file to the second DB server 400 to save the same.

The second DB server 400 functions as a database accessible from the conversion server 300 for the use of the conversion server. The second DB server 400 has a control section 401 including a CPU, ROM, RAM and the like which are all not shown, a storage section 402 including a rewritable nonvolatile memory such as hard disk drive or the like, and an Internet communication portion (not shown). By the Internet communication portion, the second DB server 400 is connected communicably with the conversion server 300. The control section 401 causes the storage section 402 to save each of the processed data received from the main server 100 via the conversion server 300, and the converted file received from the conversion server 300. Further, when having received the deletion instruction from the main server 100, the control section 401 carries out a deletion process to delete the converted file and the like saved in the storage section 402.

The AP 50 is a relaying device configured to relay the communications between Wi-Fi (registered trademark) terminals. Further, the AP 50 has a broadband router function, and is connectable to the Internet 800. The cloud service 600 is an electronic file storage service capable of storing electronic files into a database on the network, prepared by the service provider.

In the image processing system 500, when a scanned data corresponding to image I shown in FIG. 2A is uploaded from the MFP 10, then the conversion server 300 converts this scanned data into a predetermined-format file which can be referenced and edited by a predetermined application. As a result of the conversion, as shown in FIG. 2B for example, according to the one image based on the uploaded scanned data, as the converted file, such a file is generated as composed of a data D1 in which there are arranged various objects (elements) J1*a* to J1*c* generated based on that scanned data.

On the other hand, the main server 100 generates a data D2 in the same format as the converted file from the scanned data.

In particular, as shown in FIG. 2C, the main server 100 generates the data D2 in which the one image I based on the uploaded scanned data is arranged as one object J2 (also referred to as an element J2). By virtue of generating the data D2, it is possible to integrate the scanned data uploaded from the MFP 10 into the converted file. Then, by integrating the uploaded scanned data as the data D2 into the converted file, the main server 100 carries out association of the data of the converted file (data D1) with the uploaded scanned data (data D2).

As a method for the association, as shown in FIG. 2D for example, it is possible to exemplify a first method to integrate a group of pages P2 in which the data D2 is respectively arranged, behind a group of pages P1 in which the data D1 is arranged. As another example, as shown in FIG. 2E, it is possible to exemplify a second method to integrate the group of pages P2 in which the data D2 is respectively arranged, before the group of pages P1 in which the data D1 is arranged. Because the files obtained by the first and second methods can treat the group of pages P1 with the data D1 arranged and the group of pages P2 with the data D2 arranged as individual blocks respectively, each page group becomes easy to handle. For example, when displaying one page group while printing the other page group, it becomes easy to carry out a print setting for the page group to be printed, and it also becomes easy to carry out a display switching of each page for the page group to be displayed. Thus, it is possible to easily carry out the comparison between the content of the data D1 of the converted file, and the content of the data D2, i.e., the content of the scanned data.

As still another example of the association method, as shown in FIG. 2F, it is possible to exemplify a third method to integrate the data D2 into the converted file such that the pages P1 and P2 are adjacent pages which respectively arrange the data D1, and the data D2 corresponding to the data D1. Further, "the data D2 corresponding to the data D1" means that the image data corresponding to the data D1 is the same as the image data corresponding to the data D2. In the file obtained by the third method, because the pages P1 and P2 are adjacent pages which respectively arrange the data D1, and the data D2 corresponding to the data D1, it is easy to carry out the comparison between the content of the data D1 and the content of the data D2. For example, it is possible to display the page P1 arranging the data D1 and the page P2 arranging the data D2 corresponding to the data D1, at the same time on the screen according to the setting of display layout. Hence, it is easy to compare the contents of these two data.

By integrating the uploaded scanned data as the data D2 into the converted file, when carrying out the association between the data D1 and the data D2, after comparing the contents of the two data D1 and D2, it is possible to only retain the finally necessary data by deleting the pages with the unnecessary pages arranged. Especially, by the above first and second methods, because it is possible to treat the group of pages P1 with the data D1 arranged and the group of pages P2 with the data D2 arranged as individual blocks respectively, there is an advantage of easily deleting the unnecessary pages.

As shown in FIGS. 3A and 3B, the control program stored in each device carries out each process to be carried out by the CPU 11 of the MFP 10, and by the control sections 101, 201, 301 and 401 of the respective servers 100, 200, 300 and 400. Further, in the following explanations, sometimes "the CPU 11 of the MFP 10" will be simply expressed as "the MFP 10". Likewise, sometimes "the control section 101 of the main server 100", "the control section 201 of the first DB server 200", "the control section 301 of the conversion server 300", and "the control section 401 of the second DB server 400" will be expressed as "the main server 100", "the first DB server 200", "the conversion server 300", and "the second DB server 400", respectively.

When the user sets one or a plurality of manuscripts on the platen (not shown) or automatic document feeder (not shown) of the scanner 18, and inputs an instruction to the MFP 10 for carrying out a scan, then the MFP 10 causes the scanner 18 to scan the set manuscript(s) in step S1 (simply referred to as "S1" herein below. Other steps will also be denoted in the same manner). Next, the MFP 10 uploads the scanned data being the image data obtained by the scanner 18 through reading into the first DB server 200 via the main server 100 (S2). By way of the MFP 10 uploading the scanned data in S2, the main server 100 acquires the scanned data.

The main server 100 downloads the scanned data uploaded in the first DB server 200 (S3), and carries out the image adjustment process on the downloaded scanned data (S4). The image adjustment process (S4) is a process to diminish or divide the image based on the scanned data according to the size of the image. While leaving the details of the image adjustment process (S4) to later description referring to FIG. 4, when the image based on the scanned data is larger than the size of A4, and when the diminishing ratio is less than 80% for diminishing the image to the size of A4, then the image based on the scanned data is divided into images not beyond the size of A4 and, in the processes from S5, a plurality of the processed data (image data) are processed to correspond respectively to the divided images. Further, regardless of whether or not the image based on the scanned data is divided, in the processes from S5, when there are a plurality of processed data, then these plurality of processed data are processed respectively.

The main server 100 uploads the processed data obtained in the image adjustment process (S4) into the first DB server 200, and stores or saves the same into the storage section 202 (S5). Further, the main server 100 uploads the processed data obtained in the image adjustment process (S4) into the second DB server 400 via the conversion server 300, and saves the same into the storage section 402 (S6). The conversion server 300 downloads the processed data uploaded in the second DB server 400 (S7), and carries out a conversion process to convert the downloaded processed data into a predetermined-format file which can be referenced and edited by a predetermined application (S8). In this embodiment, the format of the file generated through the conversion by the conversion server 300 can be either a format prescribed in advance for the conversion server 300 or a format designated by the user when uploading the scanned data. Further, in the following explanation, for convenience, the format of the file generated by the conversion server 300 is supposed to be prescribed as the WORD format.

By the conversion process of S8, according to the one image based on the scanned data uploaded from the MFP 10, a file is generated to include the data in which various objects or elements are arranged such as image objects, graphics objects, text objects and the like generated based on the scanned data. For example, a file in the WORD format is generated to include the data D1 shown in FIG. 2B. Further, in the image adjustment process (S4), when the image based on the scanned data is not divided, then the various objects generated based on the scanned data of one page are arranged in one page. On the other hand, in the image adjustment process (S4), when the image based on the scanned data is divided, then the various objects generated based on the scanned data of one page are divided and arranged into a plurality of pages.

The conversion server 300 uploads the file obtained through the conversion process (the converted file) into the second DB server 400, and saves the same into the storage section 402 (S9). The main server 100 downloads the converted file uploaded in the second DB server 400 (S10). Further, the main server 100 downloads the processed scanned data stored into the control section 201 in the process of S5 (S11). The main server 100 carries out an association process of associating the converted, file downloaded from the second DB server 400 with the processed data downloaded from the first DB server 200 (S12). As the association process, the main server 100 of this embodiment carries out a process to integrate the processed data into the converted file. When integrating the processed data into the converted, file, the main server 100 generates a data in the same format as the converted file from the processed data. That is, it generates a WORD-format data in which the one image based on the scanned data uploaded from the MFP 10 is arranged as one object or element. For example, it generates a WORD-format data including the data D2 shown in FIG. 2C.

Further, in the image adjustment process (S4), when the image based on the scanned data is not divided, then the one image based on the scanned data of one page is arranged as one object in one page. On the other hand, in the image adjustment process (S4), when the image based on the scanned data is divided, then the one image based on the scanned data of one page is divided and arranged into a plurality of pages as one object. In the association process (S12) as described above as methods for integrating the processed data into the converted file, such methods are exemplified as the first method shown in FIG. 2D, the second method shown in FIG. 2E, the third method shown in FIG. 2F, etc. However, the method used in the association process (S12) can be either a method prescribed in advance in the main server 100 or a method designated by the user when uploading the scanned data.

Next, the main server 100 uploads the file generated in the association process (S12) into the predetermined save destination X to save the same (S13). As the save destination X, for example, it is possible to exemplify the MFP 10 which has sent the scanned data, the cloud service 600, etc. The save destination X can be either a save destination prescribed in advance or a save destination designated by the user when uploading the scanned data. When the save destination X sends out a predetermined signal such as a save-completed, signal along with the completion of saving the uploaded file, then by receiving the save-completed signal, the main server 100 can confirm that the file storage has been completed (S14). When having received the save-completed signal, the main server 100 sends a deletion instruction to the first DB server 200 (S15). Further, when having received the storage-completed signal, the main server 100 sends the deletion instruction to the second DB server 400 via the conversion server 300 (S16).

On receiving the deletion instruction from the main server 100, the first DB server 200 carries out a deletion process to delete the temporarily stored data such as the processed data and the like (S17). On the other hand, on receiving the deletion instruction from the main server 100, the second DB server 400 carries out a deletion process to delete the temporarily stored data such as the converted file and the like (S18). When the main server 100 has confirmed that the converted file is stored in the save destination X, then because of the deletion of the data temporarily stored in the first DB server 200 and the second DB server 400, it is possible to prevent the unnecessary data from accumulating in the image processing system 500. Further, until the main server 100 confirms that the converted file is saved in the save destination X, the processed data and the like are temporarily stored in the first DB server 200 as they are while the converted file and the like are temporarily stored in the second DB server 400 as they are. Therefore, even if the converted file fails to be stored into the save destination X, it is still possible to try once again to store the converted file into the save destination X by carrying out the processes of S10 to S13 over again without uploading the scanned data from the MFP 10 once more.

As described above, this process is carried out by the control section 101 of the main server 100 according to the control program. First, the control section 101 initializes a variable i to set the same to 1 (S401). Next, the control section 101 takes the scanned data of the i-th (No. i) page as the processing object (S402), and determines whether or not the scanned image based on the scanned data of the processing object is not larger than the size of A4 (S403). At this time, when the control section 101 has determined that the scanned image of the processing object is equal to or smaller than the size of A4 (S430: Yes), then the control section 101 advances the process to S404.

On the other hand, in S403, when the control section 101 has determined that the scanned image of the processing object is larger than the size of A4 (S403: No), then the control section 101 calculates a diminishing ratio for diminishing the scanned image to a size not beyond the size of A4 (S405). In particular, the calculation of S405 adopts the smaller value between the (vertical length of A4/vertical length of scanned image)×100, and the (horizontal length of A4/horizontal length of scanned image)×100. However, when the two values are an equal value, then the equal value is adopted.

When the calculated diminishing, ratio is equal to or more than 80% (S406: Yes), then the control section 101 diminishes the scanned image of the processing object by the calculated diminishing ratio (S407), and then advances the process to S404. On the other hand, when the calculated diminishing ratio is less than 80% (S406: No), then the control section 101 divides the scanned image of the processing object into a plurality of images so that a size of each of the images is not beyond the size of A4 (S408), and then advances the process to S404. In S408, division of the scanned image can be carried out by, for example, dividing the scanned image in the horizontal direction at division positions parallel to the vertical direction of the scanned image, arranged at the interval of the length of A4 in the horizontal direction from one end to the other end of the scanned image of the processing object in the horizontal direction, while dividing the scanned image in the vertical direction at division positions parallel to the horizontal direction of the scanned image, arranged at the interval of the length of A4 in the vertical direction from one end to the other end of the scanned image in the vertical direction. Further, it can also be configured to carry out an image recognition of the scanned image and, based on the recognition result, to appropriately set the vertical and horizontal division positions such that the image, text and the like can not be disjunct.

In S408, when the control section 101 has determined that the scanned images are all processed (S404: Yes), then the control section 101 ends the process. On the other hand, when the control section 101 has determined that the scanned images are not all processed (S404: No), then the control section 101 increments the variable i by one, that is, adds 1 to the variable i (S409), and returns the process to S402 to carry out the processes of S403, and S405 to S408 for the scanned data of the next page.

Thus, according to the image adjustment process (S4), even when the scanned image (the image based on the scanned data) is larger than the size prescribed in advance such as A4 or the like, it is still possible to lay the scanned image within a page of the prescribed size without losing any part of the scanned image. Further, when the diminishing ratio is not less than 80%, then the scanned image is diminished, while when the diminishing ratio is less than 80%, then the scanned image is divided. Therefore, it is possible not only to restrain the scanned image from being divided as much as possible, but also to restrain the scanned image from being diminished excessively. By virtue of this, it is possible not only to restrain the decrease in convenience because the scanned image is divided, but also to restrain the diminished scanned image from being incorrectly analyzed and thus incorrectly converted.

As explained above, according to the image processing system 500 of this embodiment, because the save destination X saves or stores the file which has integrated the scanned data into the converted file generated from the scanned data, it is possible to procure both the content of the converted file and the content of the scanned data with one file, and compare the both with each other. Hence, it is possible to easily carry out the comparison between the content of the converted file and the content of the scanned data without giving the user the trouble such as to manage the scanned data particularly, etc., thereby providing an outstanding convenience.

In the above embodiment, the image processing system 500 is an example of the image processing system. The MFP 10 is an example of the image processing apparatus. The conversion server 300 is an example of the conversion section. The save destination X is an example of the storage section, or the storage section of an external device. The first DB server 200 and second DB server 400 are an example of the storage section of the image processing system. The data D1 is an example of the first data. The data D2 is an example of the second data. The process of S2 is an example of the image acquisition mechanism or a step of acquiring the image. The process of S8 is an example of the first generator or a step of generating a first data. The process of S12 is an example of the second generator or a step of generating a second data. The process of S12 and S13 is an example of the storage control section or the storage control step. The process of S403 is an example of the size determination mechanism. The process of S407 is an example of the diminishing mechanism. The process of S408 is an example of the division mechanism. The process of S406 is an example of the diminishing ratio determination mechanism. The process of S5 and S9 is an example of the second storage control section. The process of S17 and S18 is an example of the deletion mechanism.

While the present invention is explained above based on the embodiment, it is easily inferable that the present invention is not limited to the above embodiment in any way, but can be modified and changed in various ways without departing from the true spirit and scope of the present invention.

For example, in the above embodiment, the image processing system 500 is configured as a system constructed of the main server 100, first DB server 200, conversion server 300, and second DB server 400. However, it can also be configured as a system with one server including the function of each of the servers 100 to 400.

Further, the image processing system 500 does not necessarily include the four servers, i.e., the main server 100, first DB server 200, conversion server 300 and second DB server 400 but, for example, can be a system constructed of the main server 100, first DB server 200 and second DB server 400 without including the conversion server 300. Alternatively, the image processing system 500 can also be a system excluding the conversion server 300 and second DB server 400, that is, a system constructed of the main server 100 and first DB server 200. When the image processing system 500 is a system excluding the conversion server 300, then it can be configured to cause the main server 100 to carry out each process carried out by the conversion server 300 in the above embodiment. Still alternatively, it is also possible to cause a server, which has the same function as the conversion server 300 connected communicably with the image processing system 500, to carry out each process carried out by the conversion server 300 in the above embodiment.

In the above embodiment, it is configured that the first DB server 200 is provided as a database used by the main server 100, while the second DB server 400 is provided as a database server used by the conversion server 300. However, it can also be configured to let the first DB server 200 and second DB server 400 be one database server, and to let the one database server be shared in usage by the main server 100 and the conversion server 300. In such case, the data or file which was uploaded into each of the first DB server 200 and second DB server 400 can be uploaded into the one shared database server, and the data or file which was downloaded from the first DB server 200 or second DB server 400 can be downloaded from the one shared database server.

In the above embodiment, it is configured to generate the converted file from the scanned data generated by the scanner 18 of the MFP 10. However, the image data which is the source of the converted file is not limited to the scanned data, but can be either an image data stored in a storage medium or the like such as the flash memory 12, a USB memory connected to the USB_I/F 22, etc., or an image data taken by a digital camera or the like. Further, in the above embodiment, the image processing system 500 is configured to acquire the scanned data from the MFP 10. However, the acquirer of the scanned data or the image data can also be a personal computer, a mobile terminal such as a smartphone, tablet or the like, a digital camera, etc. Further, the image data which is the source of the converted file can also be an image data pre-stored in the first DB server 200 or the second DB server 400.

In the above embodiment, it is configured that the respective servers 100 to 400 constituting the image processing system 500 carry out the processes of S4 to S18 to generate the converted file from the scanned data acquired from the MFP 10, associate the scanned data which is the converting object with the converted file, and store the associated file and data into the save destination X. However, it can also be configured to let the MFP 10 carry out the processes corresponding to S4 to S18. That is, it can also be configured that the MFP 10 generates the converted file from the scanned data acquired from the scanner 18, associates the scanned data which is the converting object with the converted file, and stores the associated file and data into the save destination X. In such case, the control program 12a can be configured to have such a content that the CPU 11 can carry out the processes corresponding to S4 to S18. Likewise, it can also be configured that an apparatus such as a personal computer, mobile terminal or the like acquires an image data such as a scanned data, generates a converted file from the image data, associates the image data which is the converting object with the converted file, and stores the associated file and data into the save destination X. When adopting those modifications, the apparatus such as the MFP 10, personal computer, mobile terminal such as smartphone, tablet or the like, etc., is an example of the image processing system. Further, in each of those apparatuses capable of becoming the image processing system, the control system such as the control program 12a or the like configured to be capable of carrying out the processes corresponding to S4 to S18 is an example of the image processing program, while the CPU 11 is an example of the computer.

In the above embodiment, the WORD format is exemplified as a format of the file generated by the conversion server 300. However, other formats, in which the file can be referenced and edited by a predetermined, application, are also adoptable, such as the HTML format, PDF format, POWER POINT (registered trademark) format, EXCEL (registered trademark) format, and the like. Although a file in the EXCEL format includes one or a plurality of sheet data, when integrating the image data such as the scanned data or the like, that image data can be integrated as a sheet data.

In the above embodiment, as a method used in the association process (S12) to associate the converted file with the scanned data, the method (see FIGS. 2D to 2F) is exemplified to integrate the uploaded scanned data as the data D2 into the converted file. However, the method to associate the converted file with the scanned data is not limited to the above exemplified method.

Figure 5A:
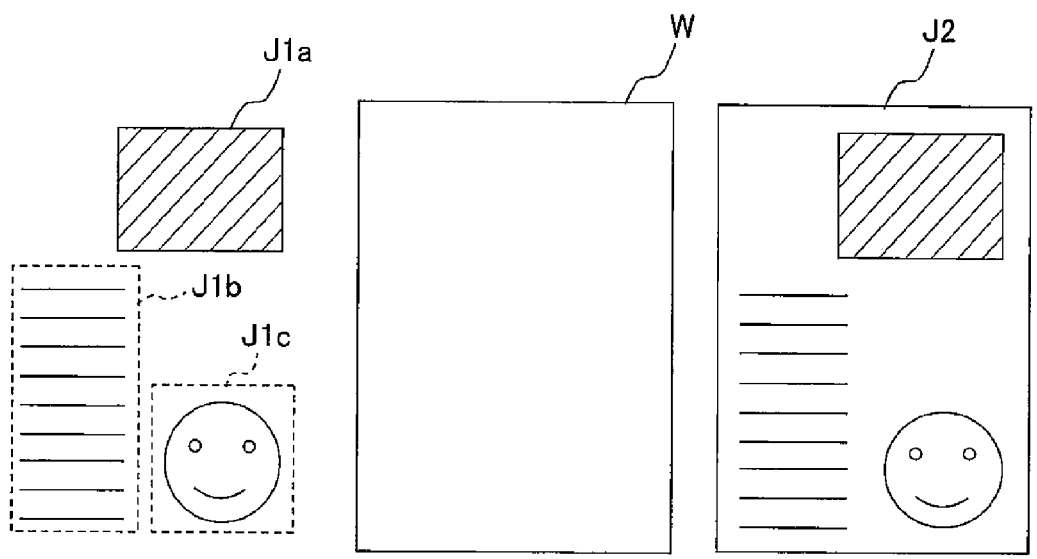
FIGS. 5A and 5B are schematic diagrams showing a modification of a method for associating a converted file with a scanned data.
Figure 5B:
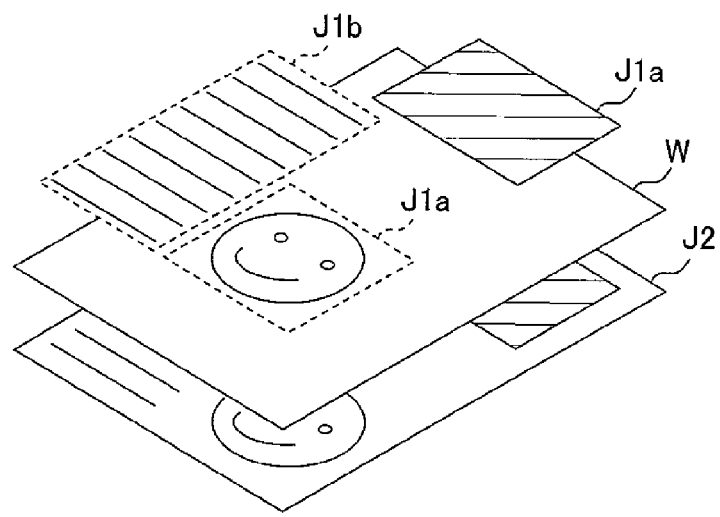
Figure 6B:
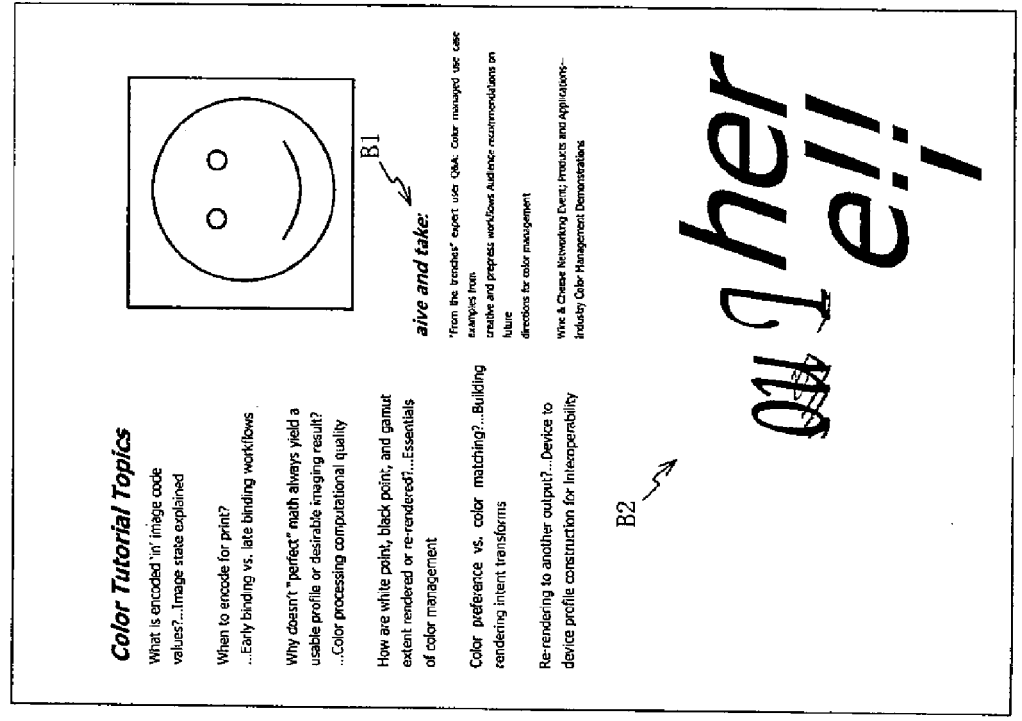
FIGS. 6A and 6B show an example that problems occur in the content of a predetermined-format file generated by conversion, due to incorrect analysis of an image data.
Figure 6A:
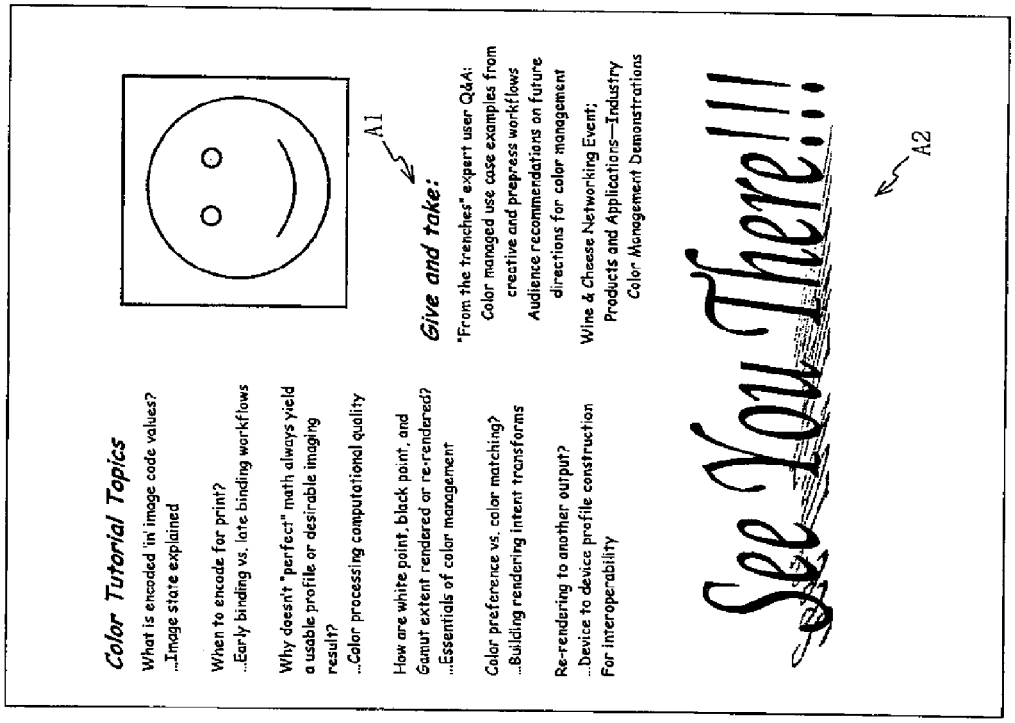

FIGS. 5A and 5B are schematic diagrams showing a modification of the method for associating the converted file with the scanned data. In this modification as shown in FIGS. 5A and 5B, the association between the converted file and the scanned data is carried out by generating a file in which a blank white image W with adjustable transparency is arranged between objects J1a to J1c arranged according to one image based on a scanned data to constitute the data D1 of the converted file, and an object J2 constituting the data D2 corresponding to the scanned data.

When the transparency of the white image W is increased, then the file generated in this modification can let the user visually recognize the state of superimposing the objects a J1a to J1c and the object J2. When there is any problem in converting the scanned data to cause differences between the content of the converted file and the content of the scanned data which is the converting object, then because these differences appear in places where the objects J1a to J1c and the object J2 are not superimposed, it is easy to discover the presence of the differences. Hence, it is possible to easily carry out the comparison, with one file, between the content of the converted file and the content of the scanned data which is the converting object. On the other hand, when the transparency of the white image W is decreased, then it is possible to cover up the object J2 constituting the data D2, that is, the content of the scanned data, and thus it is possible to display only the objects J1a to J1c constituting the data D1 of the converted file, that is, only the content of the converted file. Therefore, the file generated in this modification can be used not only as a file for the comparison between the content of the converted file and the content of the scanned data which is the converting object, but also as a file capable of displaying the content of the converted file. Further, although the blank white image W is used as an image arranged between the objects J1a to J1c and the object J2 in this modification, the color of the image is not limited to white, and a colored blank image such as a yellow image can also be used. Further, in this modification, although a file is generated to arrange the white image W between the objects J1a to J1c and the object J2, it can also be configured to generate a file just superimposing the objects J1a to J1c and the object J2 without using the white image W.

Further, as still another modification of the method for associating the converted file with the scanned data, it can also be configured to generate a file including the data D2 (to be referred to as "second file" below) without being integrated into the converted file as the data D2, separately from the converted file, and to add link information of accessibility to the second file to the data D1 constituting the converted file. The format of the second file can be either the same as or different from the format of the converted file, and it is possible to adopt various formats such as the PDF format, WORD format, EXCEL format, and the like.

In this modification, when the storage location is undetermined for the uploaded file, for instance, when the save destination X is the cloud service 600, then the main server 100 saves the second file generated from the data D2 into the save destination X before saving the converted file into the save destination X, and acquires the link information of accessibility to the second file from the save destination X. Then, the main server 100 can add the acquired link information to the converted file, and save the converted file with the added link information into the save destination X. On the other hand, when the save destination X is the MFP 10 which has sent the scanned data, then the main server 100 can add the link information based on the received information to the converted file by sending the information indicating the storage location for the second file along with uploading the scanned data into the image processing system 500. For example, a hyperlink can be attached to carry out the addition of the link information. When the file format is the EXCEL format, then a macro can be used to add the link information. Further, the addition of the link information to the converted file can be carried out either by adding the link information to at least one page in which the data D1 is arranged or by adding a dedicated page including the link information in its head or the like. Further, in contrast to the above, it can alternatively be configured to add the link information of accessibility to the converted file to the second file. Further, it can still alternatively be configured to add, to each of the converted file and the second file, the link information of accessibility to the other file.

In the aforementioned embodiment, it is configured to generate the data D2 during the association process (S12). However, as far as after carrying out the image adjustment process (S4) and before generating the converted file in the association process (S12), the data D2 can be generated at any time.

In the aforementioned embodiment, it is configured that when the diminishing ratio is not less than 80% for diminishing the scanned image to the size of A4 in the image adjustment process (S4; see FIG. 4), then the scanned image is diminished, whereas when the diminishing ratio is less than 80%, then the scanned image is divided. However, it can also be configured to carry out either the diminishing or the dividing without the distinction according to the diminishing ratio, when the scanned image is larger than the size of A4. Further, in the aforementioned embodiment, it is configured to diminish the scanned image in S407 by the diminishing ratio calculated in S405, namely, the diminishing ratio for the scanned image to be diminished to a size not beyond the size of A4. However, it can also be diminished by a diminishing ratio lower than the calculated diminishing ratio. For example, the scanned image can be diminished by a diminishing ratio a little lower than the calculated diminishing ratio such that page margins is created.

Relevant values set forth in the aforementioned embodiment are just examples, and it is possible to adopt any appropriate values correspondingly. For example, in S403 of the image adjustment process (S4; see FIG. 4), the size of A4 is exemplified as the threshold value for determining whether to diminish or to divide the scanned image. However, it is also possible to adopt any suitable sizes such as the size of letter, the size of B4, and the like. Further, in S406, 80% is exemplified to be the value of the diminishing ratio as the threshold value for determining whether to diminish or to divide the scanned image. However, this threshold value is not limited to 80%, and it is possible to adopt any appropriate values.

In the aforementioned embodiment, the image processing system 500 is configured to store or save, into the save destination X, the file which has associated the scanned data with the converted file. However, it can also be configured to store the file into a database server provided inside the image processing system 500 in a user-designatable manner such as to assign an ID or the like.

What is claimed is:

1. An image processing system comprising:
    an image acquisition mechanism configured to acquire image data;
    a first generator configured to generate, according to one image based on the image data acquired by the image acquisition mechanism, conversion data in a first format in which there are arranged a plurality of elements generated based on the image data and which is different from the image data;
    a second generator configured to generate processed data in a second format different from the first format in which there is arranged the one image based on the image data as one element and which is different from the image data; and
    a storage control section configured to associate the conversion data generated by the first generator with the processed data generated by the second generator, and to store the associated conversion data and processed data into a storage section configured to store data.

2. The image processing system according to claim 1, wherein the storage control section associates the conversion data with the processed data and stores the associated conversion data and processed data into the storage section by generating a file including the conversion data and the processed data.

3. The image processing system according to claim 2, wherein the storage control section generates the file including the conversion data and the processed data as data of pages or sheets different from each other.

4. The image processing system according to claim 3, wherein under a condition that the image acquisition mechanism has acquired a plurality of image data, the first generator generates the conversion data for each of the acquired plurality of image data; under a condition that the image acquisition mechanism has acquired the plurality of image data, the second generator generates the processed data for each of the acquired plurality of image data; and the storage control section generates the file in which the respective plurality of conversion data are arranged as successive pages or sheets, and the respective plurality of processed data are arranged as successive pages or sheets before or behind the page group or sheet group in which the conversion data are arranged.

5. The image processing system according to claim 3, wherein under a condition that the image acquisition mechanism has acquired a plurality of image data, the first generator generates the conversion data for each of the acquired plurality of image data; under a condition that the image acquisition mechanism has acquired the plurality of image data, the second generator generates the processed data for each of the acquired plurality of image data; and the storage control section generates the file in which a page or a sheet of the conversion data is arranged successively with the corresponding page or sheet of the processed data corresponding to the conversion data regarding each of the plurality of conversion data and each of the plurality of processed data.

6. The image processing system according to claim 3, wherein the storage control section generates the file including the pages or sheets with which the plurality of elements constituting the conversion data corresponding to the processed data are superimposed on the one element constituting the processed data by an arrangement based on the one image derived from the image data.

7. The image processing system according to claim 6, wherein the storage control section generates the file including the pages or sheets with which a colored blank image of which transparency is adjustable is arranged between the one element and the plurality of elements.

8. The image processing system according to claim 1, wherein the storage control section associates the conversion data with the processed data by adding, to at least one data of the conversion data and the processed data corresponding to the conversion data, link information of accessibility to the other data.

9. The image processing system according to claim 1, further comprising:
a size determination mechanism configured to determine whether or not an image based on the image data acquired by the image acquisition mechanism is larger than a predetermined size; and
a diminishing mechanism configured to diminish the image to a size not beyond the predetermined size in a case that the size determination mechanism has determined that the image is larger than the predetermined size.

10. The image processing system according to claim 1, further comprising:
a size determination mechanism configured to determine whether or not an image based on the image data acquired by the image acquisition mechanism is larger than a predetermined size; and
a division mechanism configured to divide the image into a plurality of images in sizes not beyond the predetermined size in a case that the size determination mechanism has determined that the image is larger than the predetermined size,
wherein under a condition that the image is divided by the division mechanism, the first generator generates the conversion data for every image data corresponding respectively to the divided images; and
wherein under a condition that the image is divided by the division mechanism, then the second generator generates the processed data for every image data corresponding respectively to the divided images.

11. The image processing system according to claim 10, further comprising:
a diminishing ratio determination mechanism configured to determine whether or not a diminishing ratio is not less than a predetermined value for diminishing the image to the predetermined size in a case that the size determination mechanism has determined that the image is larger than the predetermined size; and
a diminishing mechanism configured to diminish the image to the predetermined size in a case that the diminishing ratio determination mechanism has determined that the diminishing ratio is not less than the predetermined value,
wherein the division mechanism divides the image into the plurality of images m sizes not beyond the predetermined size in a case that the diminishing ratio determination mechanism has determined that the diminishing ratio is less than the predetermined value.

12. The image processing system according to claim 1, further comprising:
a second storage control section configured to store, as temporary storage data, at least the conversion data generated by the first generator, and the processed data generated by the second generator or the image data which is the source to generate the processed data into a storage section of the image processing system; and
a deletion mechanism,
wherein the storage control section associates the conversion data with the processed data and stores the associated conversion data and processed data into the storage section configured to store data, the storage section being provided in an external device; and
wherein under a condition that it is confirmed that the storage control section has completed the storage into the storage section of the external device, then the deletion mechanism deletes the temporary storage data stored into the storage section by the second storage control section.

13. The image processing system according to claim 1, wherein the first generator is configured to generate the conversion data in which a plurality of image-objects, as the plurality of elements, that are generated based on the image data are arranged.

14. The image processing system according to claim 1, wherein the first generator is configured to generate the conversion data in which a plurality of text-objects, as the plurality of elements, that are generated based on the image data are arranged.

15. The image processing system according to claim 1, wherein a data format of the conversion data generated by the first generator is same as that of the processed data generated by the second generator.

16. An image processing method for processing images, comprising:
acquiring image data;
generating, using a first generator, according to one image based on the acquired image data, conversion data in a first format in which there are arranged a plurality of elements generated based on the image data and which is different from the image data;
generating, using a second generator, processed data in a second format different from the first format in which there is arranged the one image based on the image data as one element and which is different from the image data;
associating, using a storage control section, the conversion data with the processed data; and
storing the associated conversion data and processed data into a storage section.

17. A non-transitory computer readable medium storing an image processing program executable by a computer of an image processing apparatus, the program causing the computer to execute:
acquiring image data;
generating, according to one image based on the acquired image data, conversion data in a first format in which there are arranged a plurality of elements generated based on the image data and which is different from the image data;

generating processed data in a second format different from the first format in which there is arranged the one image based on the image data as one element and which is different from the image data;

associating the conversion data with the processed data; and storing the associated conversion data and processed data into a storage section.

* * * * *